United States Patent
Holmes et al.

(10) Patent No.: US 6,852,146 B2
(45) Date of Patent: Feb. 8, 2005

(54) POCKET VANE PARTICLE AND DROPLET ELIMINATOR

(75) Inventors: Timothy L. Holmes, Kingwood, TX (US); Roberto Sanchez, Houston, TX (US); Kanti Patel, Houston, TX (US); Mark Neuman, Houston, TX (US)

(73) Assignee: ACS Industries, LP, Woonsocket, RI (US)

( * ) Notice: Subject to any disclaimer, the term of this patent is extended or adjusted under 35 U.S.C. 154(b) by 42 days.

(21) Appl. No.: 10/366,126

(22) Filed: Feb. 13, 2003

(65) Prior Publication Data

US 2004/0007132 A1 Jan. 15, 2004

Related U.S. Application Data

(60) Provisional application No. 60/395,592, filed on Jul. 12, 2002.

(51) Int. Cl.[7] .............................................. B01D 45/08

(52) U.S. Cl. ............................ 95/216; 55/440; 95/221; 95/267; 95/272; 96/355; 96/356; 96/360

(58) Field of Search .......................... 96/355–357, 360, 96/FOR 148; 95/216, 221, 267, 272; 55/440, DIG. 14

(56) References Cited

U.S. PATENT DOCUMENTS

| | | | | |
|---|---|---|---|---|
| 2,479,625 A | * | 8/1949 | Kimmell | 55/440 |
| 3,517,486 A | * | 6/1970 | Golden | 55/440 |
| 3,813,855 A | * | 6/1974 | Hill et al. | 55/440 |
| 3,912,471 A | * | 10/1975 | Cotton, Jr. | 55/440 |
| 4,157,250 A | * | 6/1979 | Regehr et al. | 96/299 |
| 4,198,215 A | * | 4/1980 | Regehr | 55/440 |
| 4,626,264 A | * | 12/1986 | Stehning | 96/252 |
| 4,802,901 A | * | 2/1989 | Wurz et al. | 55/440 |
| 5,104,431 A | * | 4/1992 | Fewel, Jr. | 55/440 |
| 5,268,011 A | * | 12/1993 | Wurz | 55/440 |
| 5,514,193 A | * | 5/1996 | Schaal et al. | 96/356 |

FOREIGN PATENT DOCUMENTS

JP  58-33006  *  7/1983  ................. 55/440

* cited by examiner

Primary Examiner—Richard L. Chiesa
(74) Attorney, Agent, or Firm—Bradley N. Ruben

(57) ABSTRACT

A vane-type mist eliminator is provided with pocket-like channels extending along the lengths fo the vanes. The pockets allow droplets entrained in a gas stream to impinge and cling to the vane, and then drain, without being re-entrained in the gas stream because they are protected from the gas stream by a portion of the pocket which defines the channel. The device does not increase the pressure drop when compared with a similar device lacking the pockets, and allows for a higher throughput before breakthrough occurs.

22 Claims, 9 Drawing Sheets

POCKET VANE PARTICLE AND DROPLET ELIMINATOR

This application claims the benefit of provisional application Ser. No. 60/395,592 filed on Jul. 12, 2002.

BACKGROUND OF THE INVENTION

1. Field of the Invention

This invention relates to improved vanes for removing entrained or suspended droplets or particulates in a gas stream.

2. The State of the Art

Many chemical and other industrial processes create a gas stream that includes non-gas particles that must be removed from the gas stream. These particles are typically liquid droplets, but can also be solid particles.

Perhaps the most typical of methods for removing these unwanted particles is a device which causes the gas/particle flow to change direction. Because the particle has a higher density than the gas of the stream, the momentum of the particle will tend to make the particle travel in a straight line and not change direction as quickly as the gas.

For example, in the case of a stream of water droplets in air, the gas stream can be passed through a wire mesh; the liquid droplets cannot negotiate the tortuous path through the mesh and so they land on and adhere to the mesh by surface tension, and then run off by gravity from the mesh screen.

Another device includes a series of vanes arranged parallely, each vane being a thin sheet that is formed into hills and valleys. The vanes are arranged spaced closely together. The gas stream enters one side and takes a zig-zag path to reach the other side. The entrained droplets cannot negotiate the rapid zig-zag and impinge on the vane, where they cling and run down the wall.

Various companies provide vane type demisters comprising a multiplicity of closely-spaced parallel sheets all providing the same geometry tortuous path. Such companies include Amistco (Alvin, Tex.), Perry Equipment Corp. (Mineral Wells, Tex.), Koch-Otto York Co., Inc. (TX), Burgess Manning (Orchard Park, N.Y.). Peerless Mfg. Co. (Dallas, Tex.), and Ed. W. Smith Mach. Works (Dallas, Tex.).

One of the problems of vane-type mist eliminators is that the droplets flowing down the vanes can be re-entrained in the gas stream. Re-entrainment is more likely as the gas velocity increases, but higher stream velocities are desired for higher throughput. At certain throughputs, the gas momentum is such that much of the separated liquid is re-entrained and exits from the device; this is termed "breakthrough."

SUMMARY AND OBJECTS OF THE INVENTION

One object of this invention is to improve the capacity of vane-type mist eliminators.

Another object of this invention is to improve the efficiency of vane-type mist eliminators without increasing the pressure drop across the device.

Yet another object of this invention is to improve the efficiency of vane-type mist eliminators without decreasing the gas flow rate at which breakthrough occurs.

These and other objects of the invention are achieved by providing pockets in the vanes, the pockets providing channels that allow the separated liquid to be removed and to be shielded from the gas stream to avoid being re-entrained.

More specifically, the invention comprises a vane-type mist eliminator having multiple parallel undulating surfaces wherein corresponding undulations are provided with a pocket channel.

The present invention is described particularly with respect to mist eliminators. Nonetheless, this invention is also applicable to solid-gas streams to the extent that the solid particles separated into the pockets do not agglomerate or clog the channels.

DETAILED DESCRIPTION OF SPECIFIC EMBODIMENTS

As used in the following description, the term "particle" is meant to include both solid particles and liquid droplets (liquid particles), just as the term "mist eliminator" is meant to include the elimination of solid particles.

Figure 1:
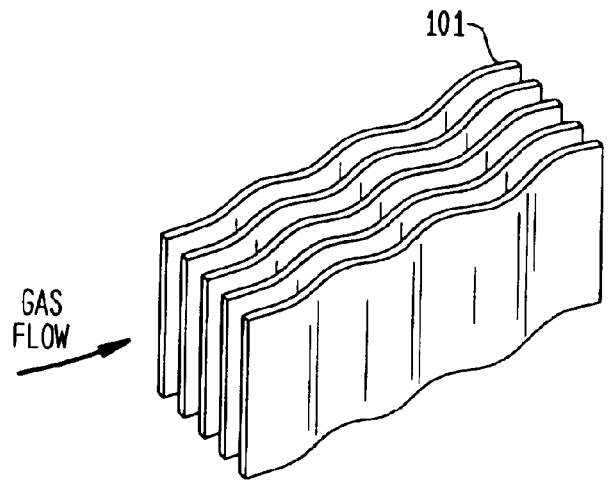
FIGS. 1, 2A through 2D depict prior art versions of vane-type mist eliminators.
Figure 2A:
Figure 2B:
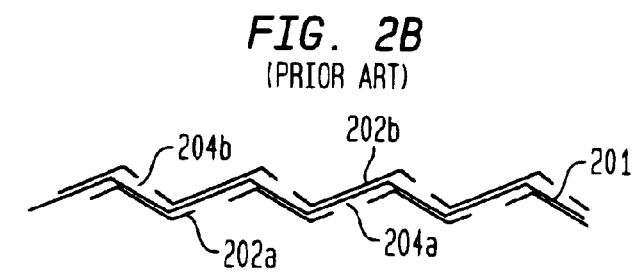
Figure 2C:
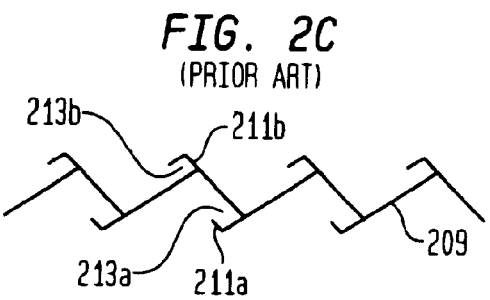

As shown in FIGS. 1 and 2A (from *Perry's Chemical Engineers' Handbook*, $6^{th}$ Ed. (1984: McGraw-Hill, N.Y.), 18–74, FIGS. 18–110), conventional vane-type mist eliminators comprise a series of parallel vanes 101, each vane in a sheet-like geometry. Each sheet creates vanes by a series of undulations; smoother type undulations are shown in FIG. 1 whereas sharp type undulations are shown in FIG. 2A. The gas stream enters parallel with the sheets of vanes, and the undulations force the gas stream to take a tortuous path, whereby the entrained liquid droplets impinge and cling to the vanes, and then run down (by the force of gravity) to be collected and removed. FIG. 2B shows another prior art device, only one sheet of which is shown. The main sheet 201 has a simple zig-zag pattern presenting two opposite sides, each side which has Z-shaped additions 202a and 202b added to provide pockets 204a and 204b on the opposite sides. FIG. 2C depicts another prior art device, again only one sheet of which is shown, having a main sheet 209 in a zig-zag or simple pleated pattern with L-shaped wings 211a and 211b extended from the pleat folds to provide pockets 213a and 213b on the opposite sides of the device. Finally, FIG. 2D depicts a prior art device (Plate-Pak™ brand from ACS Industries, Houston, Tex.) having parallel front/back walls 211 joined by angled side walls 223.

Figure 2D:
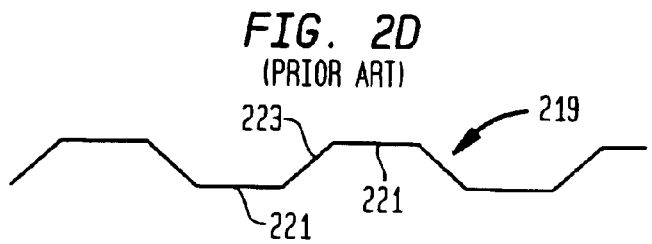
Figure 3:
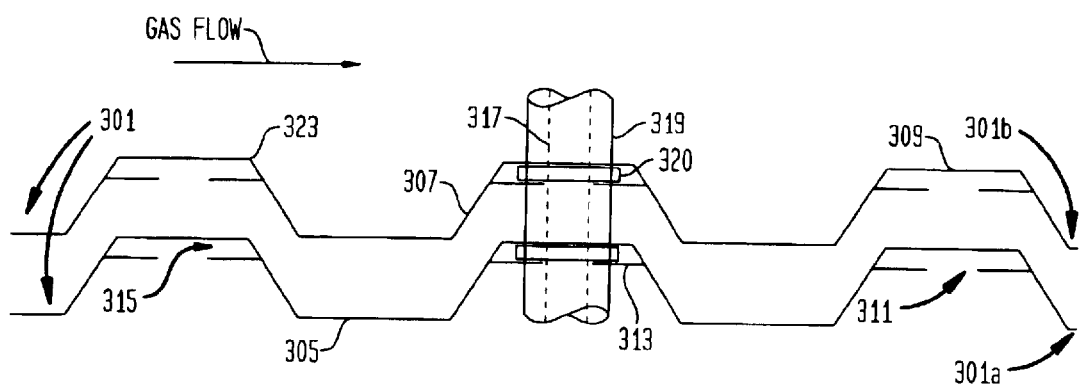
FIGS. 3 and 4A are, respectively, plan and front views of an idealized section of an embodiment of a mist eliminator according to this invention.
Figure 4A:
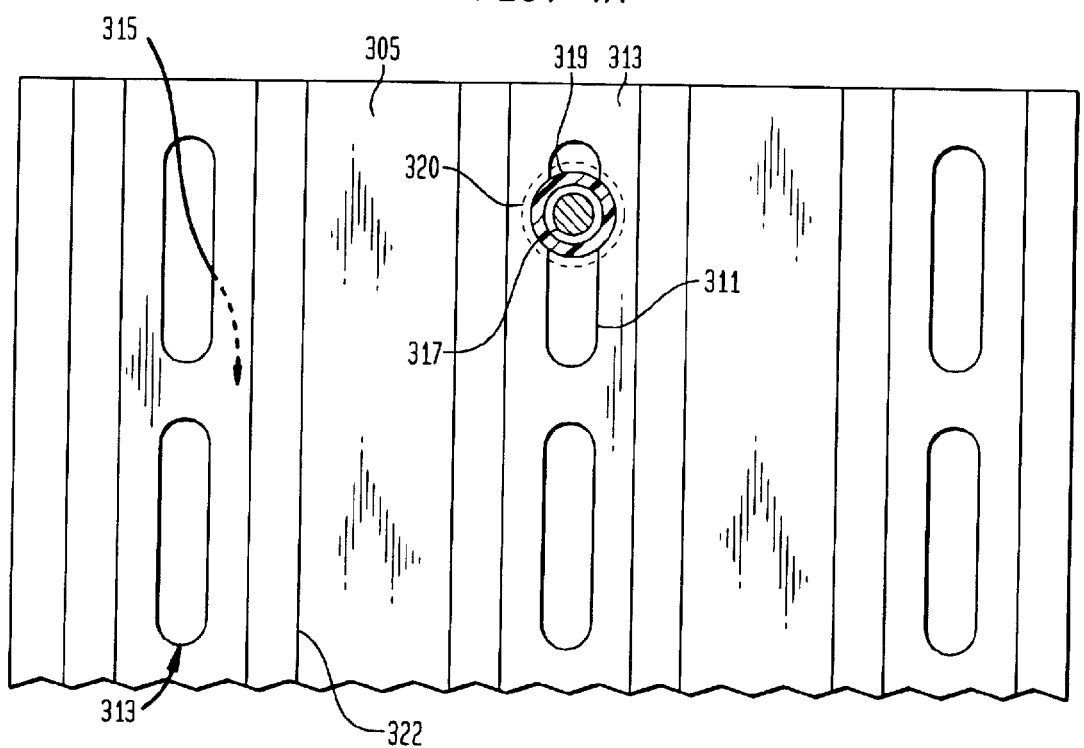

The present device uses the structure of the device shown in FIG. 2D to improve upon all of the prior art devices. As shown in FIGS. 3 and 4A, the device of the present invention includes a plurality of vanes 301 arranged in parallel, each vane having a front side 301a and a back side 301b. Each vane is formed into undulations defining a front wall 305, a middle wall 307, and a back wall 309. As shown, on the front side of the back wall is an opening 311 formed by a partition 313 to define a channel 315 between the partition and the back wall. The channel is in the form of a pocket because it is protected from the gas stream by the partition. Preferably the channel depth (distance between the back wall and the partition) is about ⅛ inch (3.175 mm) for a mist eliminator.

Figure 4B:
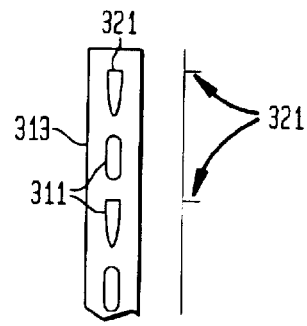
FIG. 4B is another embodiment of the partitions shown in FIGS. 3 and 4A.

The sheets of vanes are typically held in their arrangement by a combination of a bolts 317 and spacers 319 and 320 in FIG. 4A (only one set of which is shown). The distance between adjacent sheets is preferably about ⅜ inch (9.525 mm) between the partition and the next adjacent sheet back wall. The bolt passes through the opening in the partition, through an opening in the back wall (not shown), and on to the next partition and back wall. The vanes are separated from each other by spacers 319, preferably of a metallic material (such as a tube or nut), but they can be made of plastic. The partition is maintained a desired distance from the back wall by a second spacer 320, such as a washer or nut or a shorter length of tube. The bolt passes through both spacers in this construction, assembly is rather easy and does not require expensive and timely welding steps to form the pockets. In addition, the distance between the partition and the back wall can be controlled by the thickness of the spacer 320, as the distance between vanes is controlled by the thickness of spacer 319. Yet another structure for the spacers between the partition and the back wall is to provide legs 321 stamped from the partitions, as shown in FIG. 4B, having a plan and side view of a partition with legs. The partitions and the openings in the partition are preferably made by stamping. During such an operation, legs 321 can be stamped and bent to provide a spacer performing the function of the 319 spacer, essentially forming a self-spacing device.

The vanes are typically made of metal (stainless steel or aluminum) but can be made of plastic or other materials.

The vanes can be defined by edges 321 between the front and middle walls and 323 between the middle and back walls.

FIG. 4A is a front view showing the openings as spaced ovals. Thus, the partition can be a long bar with oval openings attached to the back wall (by bolting or by welding). It is not necessary to have a section of the partition separate the openings; the pocket can be formed from a partition having a single, long opening the length of the sheet. The shape of the opening is not important. What is important is that the width of the opening (along the direction of the gas flow) not be too large in order to keep the channel protected from the gas stream and thereby avoid re-entrainment. Similarly, if the width of the opening is too small, the collection efficiency will diminish. Depending on the design characteristics of the particular process installation for which the present device is intended, different opening widths can be tested to determine empirically what width opening should be used for that installation.

While the embodiment shown in FIG. 3 only has pockets on the front side of the back wall, one could easily envision also putting pockets on the back side of the front wall. Or, instead, pockets could be used only on the middle walls, on the front and/or back side.

Figure 5A:
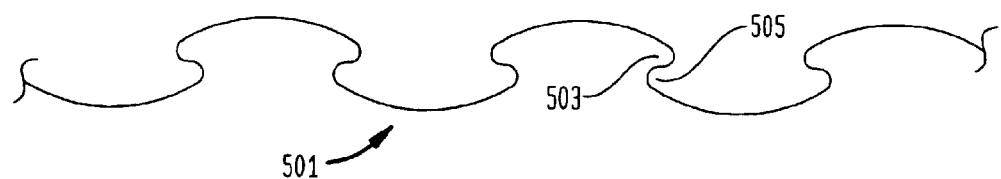
FIGS. 5a and 5b are other embodiments of the mist eliminator of this invention with pockets on the front and back sides.

FIG. 5a is another embodiment, wherein a single piece of material is folded to provide a vane 501 having pockets 503 on the front wall and 505 on the back wall. Such a device can be formed from a single sheet of metal.

Figure 5B:
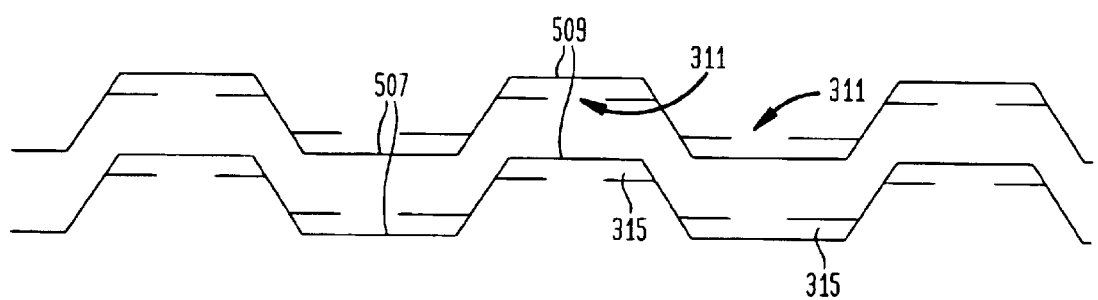

FIG. 5b is similar to the device shown in FIG. 3, with the addition of pockets on the back side. In addition, in another preferred embodiment, the sheets can be provided with a combination of wide 507 and narrow 509 back walls.

In use, the particle separator of this invention can be disposed in a vessel of any orientation, such as vertically in a column or tower, horizontally in a tank, or diagonally in a conduit, so long as it is oriented properly with respect to the gas stream flow. Thus, the orientation of the pockets can be horizontal, vertical, or diagonal.

When multiple sheets are constructed together as described herein to, in a configuration analogous to that shown in FIG. 1, the bottom structure may be formed into a sump (not shown), or the structure on which the particle separator is supported can be made with a sump on which the separator is supported.

COMPARISON EXAMPLES 1

Pressure Drop

A conventional mist eliminator (Plate-Pak™ brand, available from ACS Industries, LP, Houston, Tex.) and mist eliminators as shown in FIGS. 3 and 5b were used, which were the conventional Plate-Pak™ brand device modified as described herein. The box in which the vanes were housed for these experiments was about 20¾ in. (52.7 cm) in height and about 19¾ in. (50.2 cm.) in width, and about 8 in. (20 cm.) deep in the direction of the gas flow, also called the "thickness" when applied to the dimension of the vane. A standard thickness is eight inches, so if the device shown in FIG. 3 is eight inches thick, it is seen to have three pockets; and if the device shown in FIG. 5b is eight inches thick, it is seen to have five pockets.

For the results shown in FIGS. 6 through 9 for the three pocket vane, the spacing between the vanes was about one-half inch (1.25 cm), so there were about 35 vanes. The width of the partition was about one inch (2.5 cm) and the openings were 9/32" (7 mm) by 1⅝" (4.2 cm.) on 2 inch (5 cm) centers, and the part made of 16 or 20 gauge metal; the openings were formed by die punch press.

For the results shown in FIGS. 8–11 for the five pocket vane, a device having wide and narrow back walls, as explained above in connection with FIG. 5b, was used. The partitions for the narrow back walls were 31/32-inch wide and for the wide back walls were 1¼ inches wide. The openings in the partition were 5/16-in. by 1⅝-in. on two inch centers. The intervane spacing of ½-in. was achieved using legs (321 in FIG. 4B) extending ⅜-in. from the partition spaced on four inch centers, the legs being 3/16-in. wide, and abutting the back wall (509) that is ⅛-in. from the next partition, the total of ⅛-in. plus ⅜-in. giving ½-inch.

A mixture of air and water was used as the test stream, using a 15 HP radial blade blower with an inlet damper for air flow control, a 12 inch., Sch. 20, 16 foot long exit pipe from the blower, and using a Dwyer model DS-400-12 multi-orifice flow sensor for air flow measurement, all for supplying a six foot long horizontal test chamber. The outlet from the test chamber had a 40 inch long Sch. 20 pipe including a FilterSense Model LM-70 Mist Gauge for entrainment measurement. A vertical flow test chamber was similarly constructed. The pressure drop was measured with an inclined manometer (measurement in inches of water column), the test system temperature having been measured with a Weksler Instruments dial thermometer with 1° F. gradations. The inlet loading was applied with either full cone water (Bete SCM9SQ), but more preferably, as in these examples, using a two-fluid (Spraying Systems ½J+SU 79) air-water spray nozzle. The water was recycled to the inlet using a 2 HP Teel centrifugal pump and metered using a zero to five GPM rotameter. The openings on the five pocket device (FIG. 5b) (311) were 9/32-inch wide as in the three pocket device, but later the slot width was increased to 5/16-inch. so that 3/16" wide tabs or legs could be added to the partitions for proper spacing and improved mechanical integrity. Optimum performance was observed when ³⁄₁₆-inch wide and ³⁄₈-inch long tabs were placed on four inch spacing for the partitions. Pressure drop increases and reduced capacities were observed when compared with ⅛" and ⅜" opposing legs added to each opening.

Figure 6:
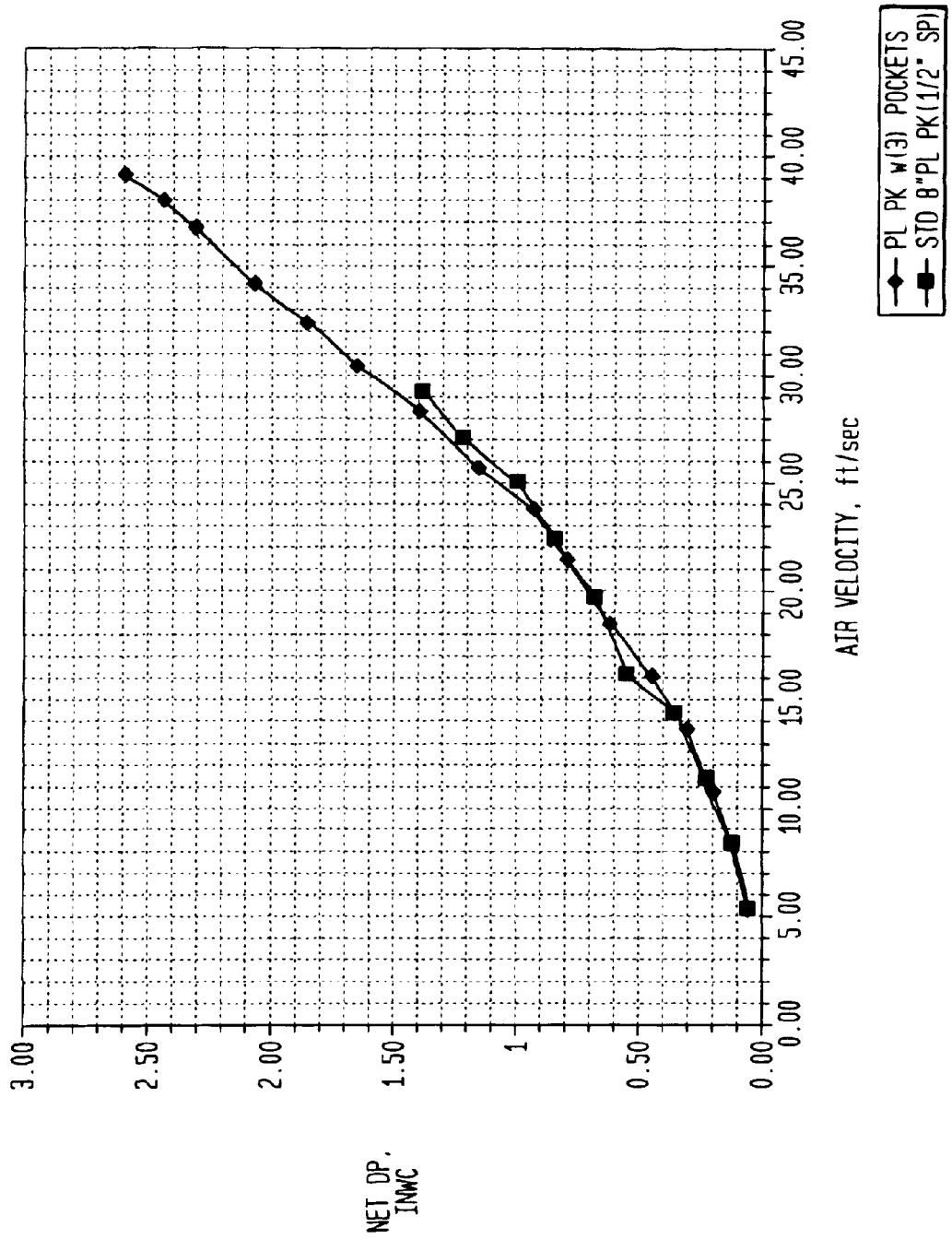
FIGS. 6 through 11 are, respectively, comparative test results for pressure drop (NET DP) and breakthrough (ENTR) using a device as shown in FIGS. 3 and 5b and one of the prior art.

FIG. 6 shows the results of the comparative testing, the squares ■ representing a convention mist eliminator and the diamonds ♦ representing the three pocket inventive device. As seen, from air velocities from 5 ft/sec to 30 ft/sec, the pressure drop across the present device is not any greater, and is essentially the same, as the pressure drop across the conventional device. Accordingly, for the same process stream, the present device does not adversely affect the flow (which is proportional to the pressure drop).

Figure 8:
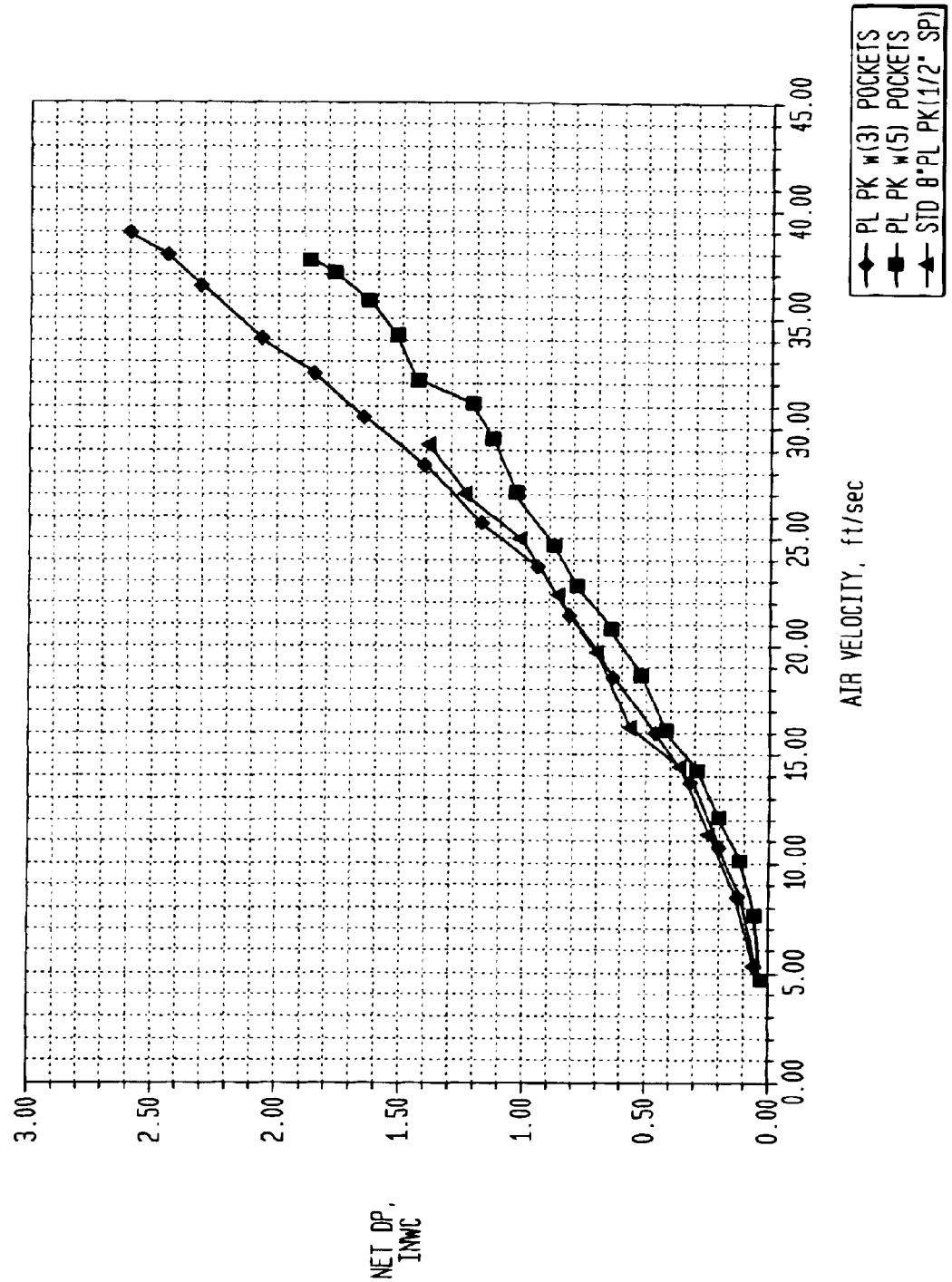

FIG. 8 shows the results of the comparative testing for horizontal flow between the standard device and vanes with three pockets (as shown in FIG. 3) and with five pockets (as shown in FIG. 5b), the triangles ▲ representing the conventional 8" Plate-Pak™ with ½-inch spacing between the sheets, the circles ● representing the invention of this device with three pockets, and the squares ■ representing the invention of this device with five pockets. As seen, with air velocities from 5 ft/sec to 38 ft/sec, the pressure drop across the present device with three pockets is not any greater, and is essentially the same, as the pressure drop across the conventional device, while the present device with five pockets has a lower pressure drop for the same air velocity for essentially the entire range of air velocities tested. Accordingly, for the same process stream, the present device does not adversely affect the flow (which is proportional to the pressure drop), and may actually decrease the pressure drop if the five pocket device is used.

Figure 10:
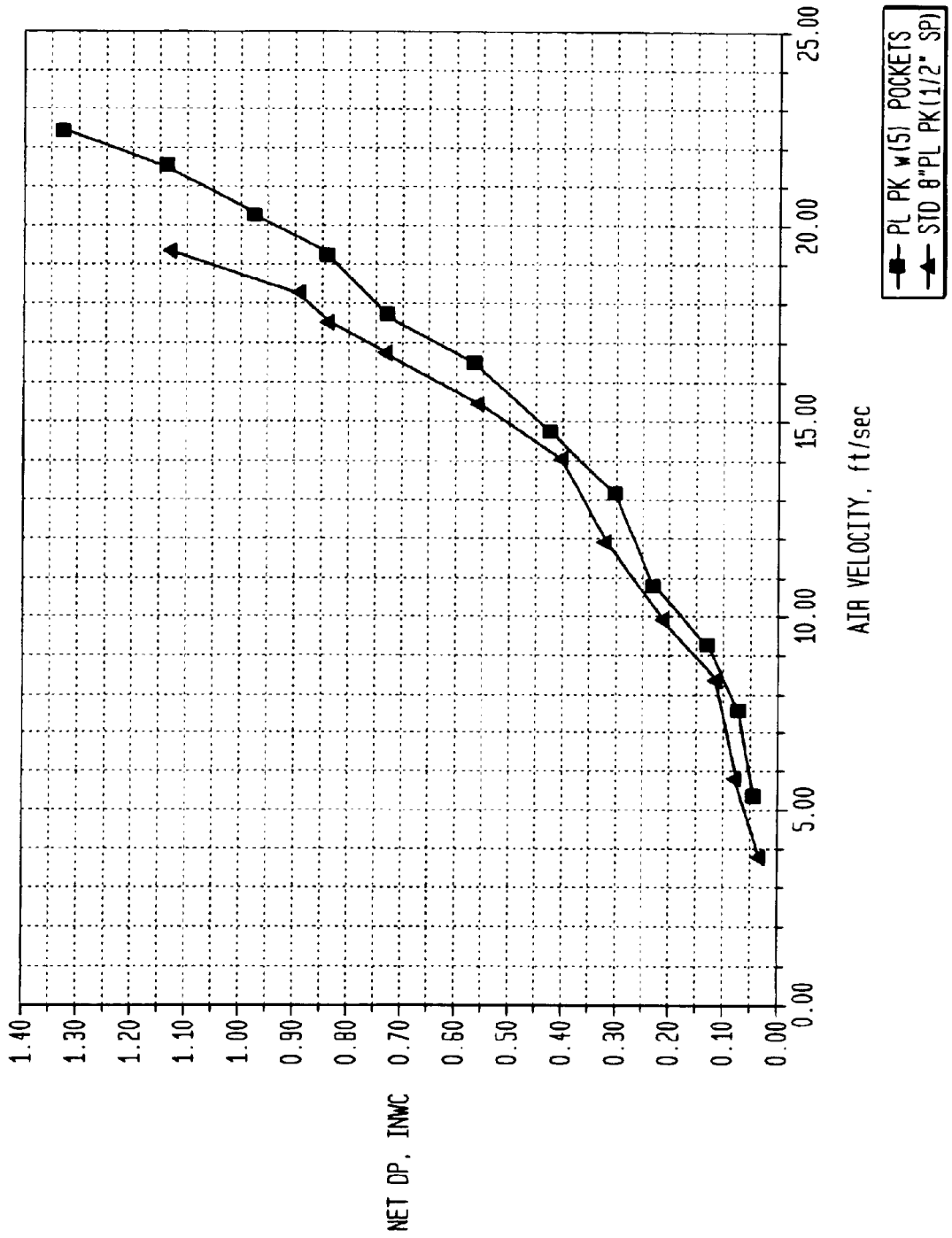

FIG. 10 shows results of comparative testing for vertical flow between the standard device (triangles ▲) and vanes with five pockets (squares ■) as described for these examples. Again, for essentially all air velocities tested, the five pocket vane had a lower pressure drop across the eight inch thickness of the device.

COMPARISON EXAMPLES 2

Entrainment

Figure 7:
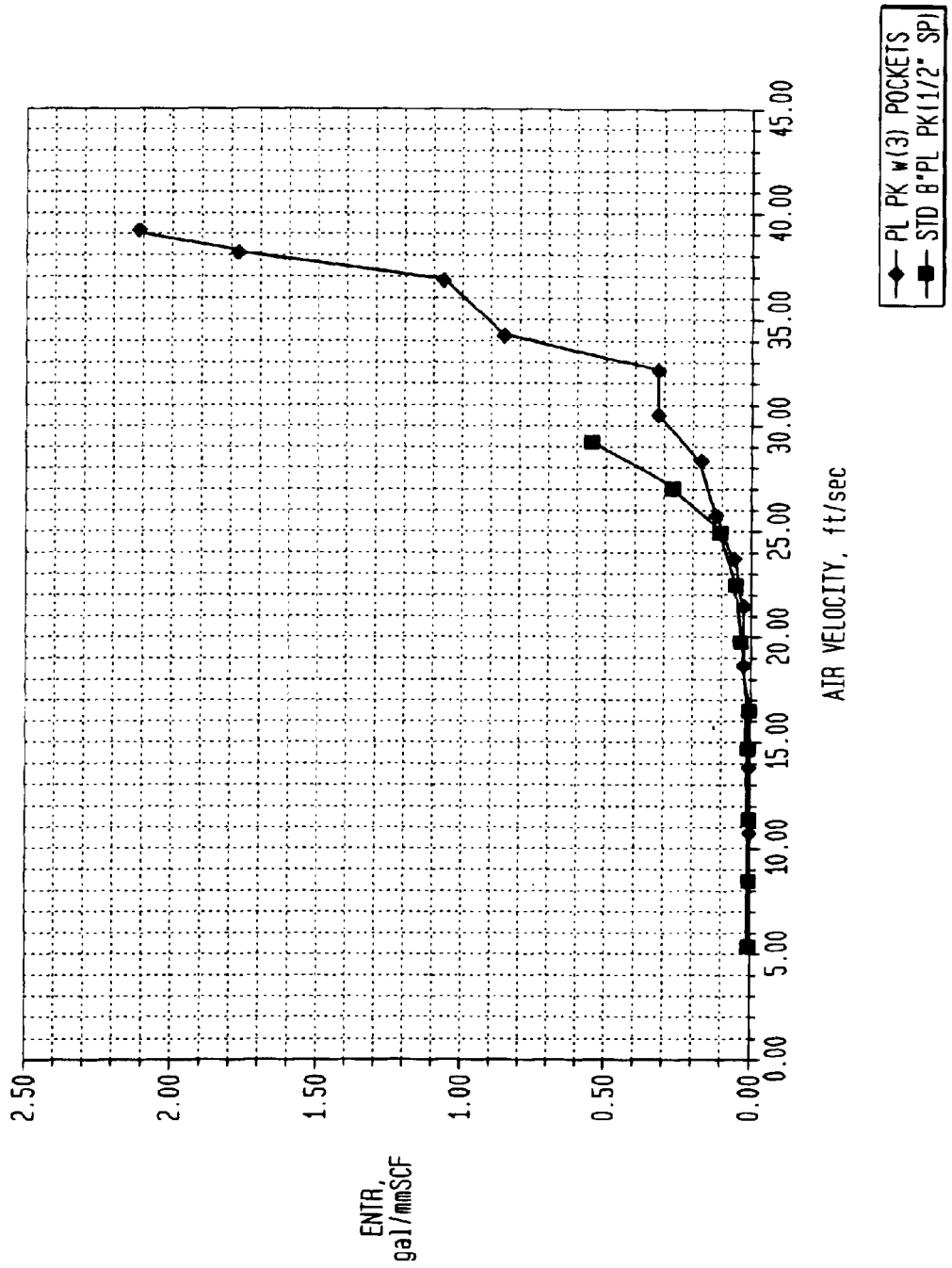

Using the same devices, materials, and specifications as described in Comparison Examples 1—Pressure Drop, the devices were tested to determine their capacity to eliminate water drops from the air stream. Capacity was determined by the air velocity at which breakthrough started to occur. The amount of water in the exit stream was determined using an electric induction probe (model LM 30, ProFlow brand series, from Impolit Environmental Control Corp., Beverly, Mass.). The outputs of the probe were used to calculate entrainment ENTR as $gal_{water}/mmSCF_{air}$ (gallons of water per million standard cubic feet of air). As shown in FIG. 7 (diamonds for the three pocket invention, squares for the conventional device), breakthrough for the conventional device starts to occur much more rapidly than with the present device. For the conventional device to change from about 0.1 to about 0.55 ENTR occurred between about 25 and less then 30 ft/s air velocity, whereas for the present device the same change occurred between about 25 and about 33 ft/s. The graph shows that the configuration of the present device allowed 4 ft/s more air velocity before breakthrough, an increase of at least 10%. In practical terms, this improvement can translate into improved production capacity through improved throughput.

Figure 9:
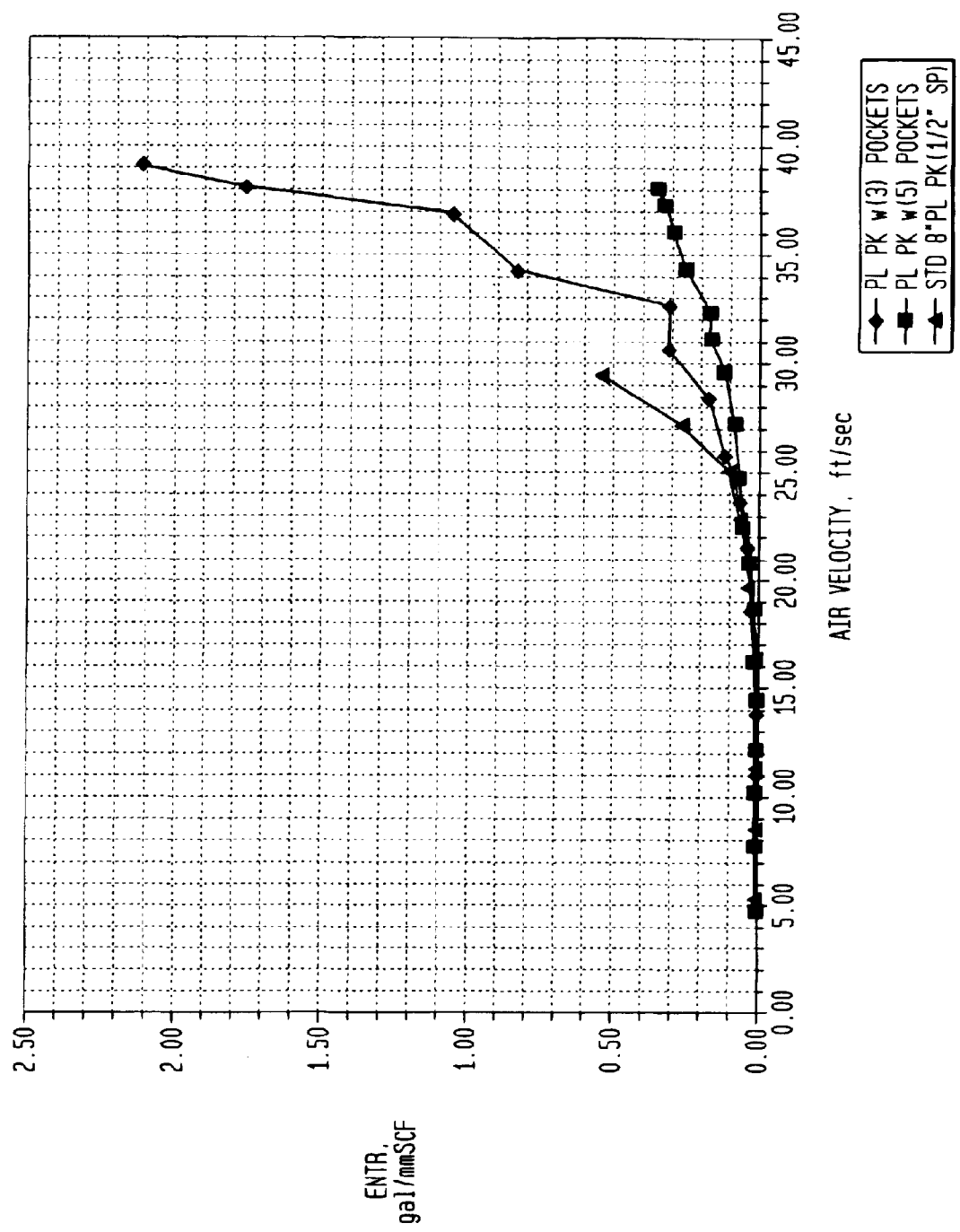

FIG. 9 shows a comparison of the entrainment breakthrough for horizontal flow in among the standard eight inch thick device, the three pocket vane, and the five pocket vane having wide and narrow back walls. As shown in FIG. 9, breakthrough in the standard device occurs at less than 30 ft./sec., for the three pocket device at between 30 and 35 ft./sec., and does not appear to occur in the five pocket device even at air velocities of 38 ft./sec.

Figure 11:
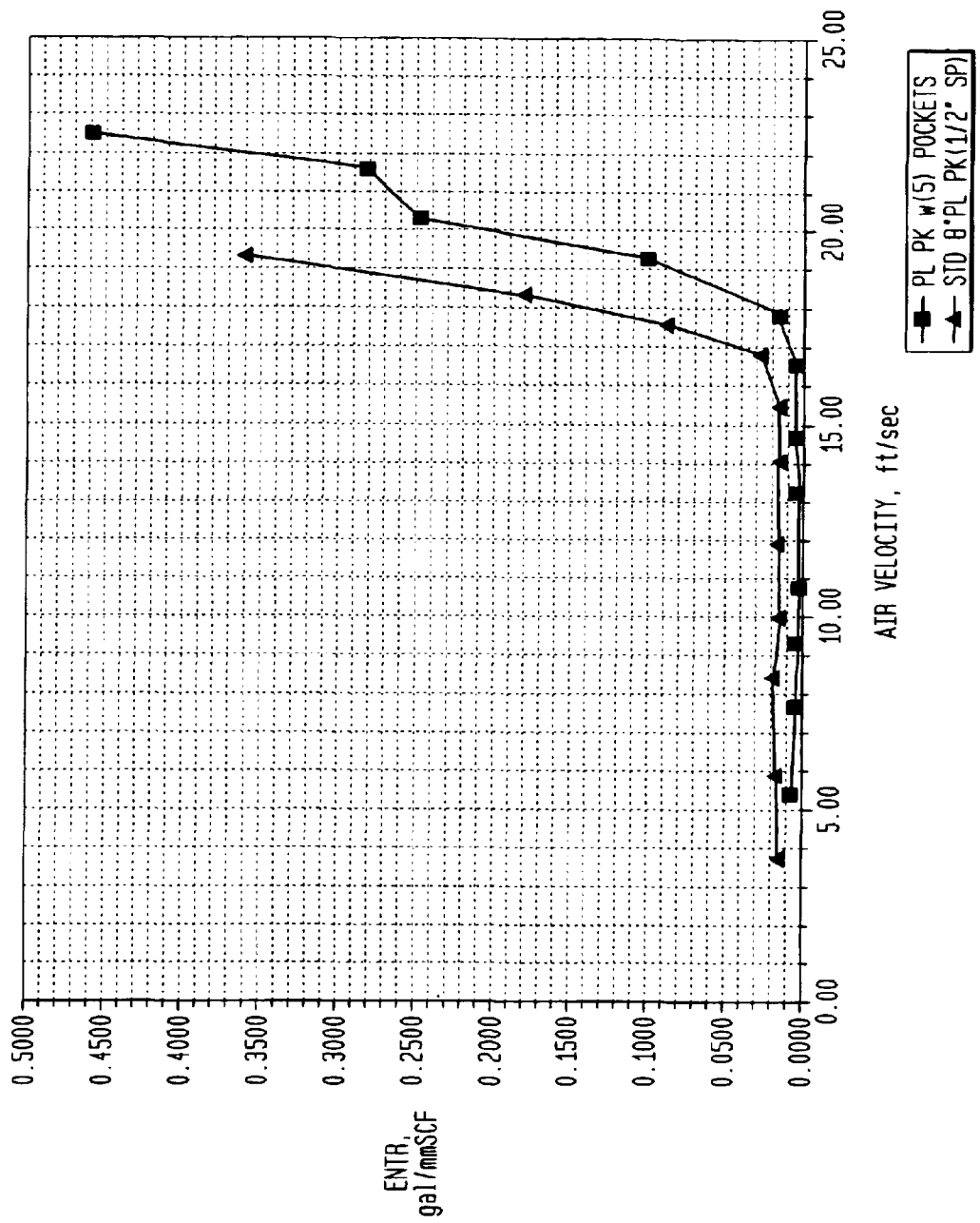

FIG. 11 shows a comparison of the entrainment breakthrough for vertical flow between the standard device and the five pocket vane of this invention. The inventive separator increased the breakthrough by about 2 ft./sec. air velocity.

Exemplary Data

Exemplary data for FIGS. 8–11 in the foregoing examples are provided in the following tables:

TABLE 1

Capacity Comparison

| Flow Direction | Water ENTR Gal/mmSCF | Air Velocity, ft./sec. | | | Capacity increase, % | |
|---|---|---|---|---|---|---|
| | | Standard | 3 Pocket | 5 Pocket | 3 Pocket | 5 Pocket |
| Horizontal | 0.1 | 25.0 | 25.2 | 28.3 | 0.8 | 13.2 |
| | 0.2 | 26.2 | 28.7 | 32.8 | 9.5 | 25.2 |
| | 0.3 | 27.3 | 29.2 | 36.0 | 7.0 | 31.9 |
| | Mean | | | | 5.8 | 23.4 |
| Vertical | 0.1 | 17.7 | — | 18.3 | — | 3.4 |
| | 0.2 | 18.5 | — | 20.1 | — | 8.6 |
| | 0.3 | 19.1 | — | 21.8 | — | 14.1 |
| | Mean | | | | — | 8.7 |

TABLE 2

Pressure Drop Comparison

| Flow Direction | Air Velocity ft/sec | Pressure Drop, inch of water col. | | | Pressure Drop Decrease, % | |
|---|---|---|---|---|---|---|
| | | Standard | 3 Pocket | 5 Pocket | 3 Pocket | 5 Pocket |
| Horizontal | 10 | 0.19 | 0.18 | 0.10 | 5.3 | 47.4 |
| | 15 | 0.42 | 0.39 | 0.33 | 7.1 | 21.4 |
| | 20 | 0.61 | 0.61 | 0.59 | 0.0 | 3.3 |
| | 25 | 1.00 | 1.08 | 0.9 | −8.0 | 10.0 |
| | Mean | | | | 1.5 | 20.5 |
| Vertical | 10 | 0.22 | — | 0.17 | — | 18.2 |
| | 15 | 0.50 | — | 0.44 | — | 12.0 |
| | 20 | — | — | 0.93 | — | — |
| | Mean | | | | — | 15.1 |

TABLE 3

Capacity as a function of Inlet Misting Loading

| Flow Direction | Mist Loading GPM/ft.$^2$ | Air Velocity, ft./sec. | | | Capacity Increase, % | |
|---|---|---|---|---|---|---|
| | | Standard | 3 Pocket | 5 Pocket | 3 Pocket | 5 Pocket |
| Horizontal | 2.000 | 25.0 | 25.2 | 28.3 | 0.8 | 13.2 |
| | 1.000 | — | — | — | — | — |
| | 0.222 | 30.0 | — | — | — | — |
| | Mean | | | | 0.8 | 13.2 |
| Vertical | 2.000 | 17.7 | — | 19.3 | — | 9.0 |
| | 1.000 | 19.0 | — | 22.0 | — | 15.8 |
| | 0.222 | 24.2 | — | 25.2 | — | 4.1 |
| | Mean | | | | | 9.6 |

In general, experimental results when comparing the aforementioned Plate-Pak devices with the instant invention, for eight inch thickness in the 0.1 to 0.3 gal/mmSCF range, five pocket vanes (such as shown in FIG. 5b) exhibited a 13% to 32% capacity increase (23.4% mean) verses the conventional device with a vertical vane orientation (horizontal flow tests) for air-water mixtures, and a 3.4% to 14.1% increase (mean 8.4%) verses the conventional device for a horizontal vane orientation. Accordingly, the present device provide better capacity.

The affect of load (inlet water spray in gallons per minute, per area of the particle separator) on capacity was also seen experimentally. As the load was reduced from 2 GPM/ft.$^2$ to 0.222 GPM/ft.$^2$ (the area basis being essentially the cross sectional superficial flow area, the presence of the vanes being ignored), the conventional Plate-Pak™ devices showed an increase in capacity of 36.7% while five pocket vanes according to this invention had a 30.6% increase in capacity (both being on average), both at an exit entrainment loading of 0.1 gal/mmSCF. The capacity of the five pocket vane according to this invention was generally 9.6% greater than that of the conventional device for variable liquid loading in vertical flow tests.

With reference to Table 4, the capacity to the end point of an exit loading of 0.1 Gal/mmSCF, with a 2 GPM/ft$^2$ inlet loading, is shown to compare the theoretical standard vane with the pocket vane of this invention. The air velocities shown are the design values for the standard vane and the experimental values for the inventive pocket vane. As seen from Table 4, for horizontal flow the inventive pocket vane actually provides an increase of 51.3% over the design value for the standard vane; and for vertical flow the inventive pocket vane actually provides an increase of 34% over the design value for the standard vane. The design values for the inventive pocket vane would be expected to be 80% to 90% of the experimental values obtained by testing as described above.

Other experimental comparisons between the five pocket vane design and the standard Plate-Pak™ devices show that the pressure drop for horizontal flow (vertical orientation) at air velocities in the range of about 10 to 25 ft./sec. were, on average, 20.5% less than with the conventional device. The pressure drop was about 15.1% less, on average, for the vertical flow orientation with air velocities in the 10 to 20 ft./sec. range. These results are for an inlet water spray per mist loading of about 2 GPM/ft.$^2$ Accordingly, the present devices induce less of a pressure drop than existing devices.

It should be readily apparent that the results achieved with these examples have been tailored for a particular environment. In practice, a given installation will have an existing flow direction (horizontal, vertical, or perhaps in between), gas and liquid (or gas and solid, or liquid and solid) composition, design flow rate (possibly within a range), temperature, and other parameters. The thickness of the vanes, the number of pockets, the spacing of the vanes, and other parameters can be varied to achieve an adequate or optimum separation using techniques such as described herein.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A mist eliminator sheet formed into undulations that define a front wall and a back wall substantially parallel to each other and connected by a side wall, and a pocket extending along the back wall, wherein two partitions extending across the back wall from side walls adjacent said back wall define the pocket, an opening to the pocket defined by a space between said partitions.

2. The mist eliminator sheet of claim 1, wherein the pocket is formed by bending the sheet.

3. The mist eliminator sheet of claim 1, wherein the sheet defines opposing front and back sides, the front wall closer to the front side than the back wall, and the back wall closer to the back side than the front wall, the said pocket extending along the front side of the back wall, and further comprising a pocket extending along the back side of the front wall.

4. The mist eliminator sheet of claim 1, wherein the sheet has three pockets.

5. The mist eliminator sheet at claim 3, wherein the sheet has five pockets.

6. The mist eliminator of claim 1, wherein the orientation of eliminator is defined with respect to a vertical and a horizontal reference, and wherein the pockets are disposed essentially vertically.

7. The mist eliminator of claim 1, wherein the orientation of eliminator is defined with respect to a vertical and a horizontal reference, and wherein the pockets are disposed essentially horizontally.

TABLE 4

Standard Vane vs. Inventive Pocket Vane Capacity Comparison

| Flow Direction | Mist Loading | | Air Velocities (ft/s) | | Potential |
|---|---|---|---|---|---|
| | Inlet GPM/ft$^2$ | Exit Gal/mmSCF | Standard Vane Design Values | 5-Pocket Vane Exper. Values | Capacity Increase, % |
| Horizontal | 2.0 | 0.1 | 18.7 | 28.3 | 51.3 |
| Vertical | 2.0 | 0.1 | 14.4 | 19.3 | 34.0 |

8. A mist eliminator, comprising a plurality of mist eliminator sheets, each sheet formed into undulations that define a front wall and a back wall substantially parallel to each other, and a pocket extending along the back walls, wherein two partitions extending across the back wall from side walls adjacent said back wall define the pocket, an opening to the pocket defined by a space between said partitions.

9. The mist eliminator of claim 8, wherein the pocket is formed by bending the sheet.

10. In the method for separating liquid and/or solid particles from a gas stream by providing a series of undulating vanes to create a tortuous path and sending a gas stream with entrained or suspended particles through the tortuous path, the vanes being part of a sheet having front and back walls, the improvement comprising: providing pocket channels along the back walls, between two partitions extending across the back wall from side walls adjacent said back wall define the pocket, an opening to the pocket defined by a space between said partitions.

11. The method of claim 10, wherein the particles are liquid.

12. The method of claim 10, wherein the particles are solid.

13. The method of claim 10, the sheet defining opposing front and back sides, the front wall closer to the front side than the back wall, and the back wall closer to the back side than the front wall, the said pocket channels extending along the front side of the back walls, the improvement further comprising pocket channels extending along the back side of the front walls.

14. The method of claim 10, wherein the orientation of the vanes is defined with respect to a vertical and a horizontal reference, and wherein the pockets are disposed essentially vertically.

15. The method of claim 10, wherein the orientation of the vanes is defined with respect to a vertical and a horizontal reference, and wherein the pockets are disposed essentially horizontally.

16. A process tower or column designed to accommodate a vapor flowing upwards and having therein a mist eliminator, said mist eliminator comprising a plurality of mist eliminator sheets, each sheet formed into undulations that define a front wall and a back wall substantially parallel to each other, and a pocket extending along the back wall, wherein two partitions extending across the back wall from side walls adjacent said back wall define the pocket, an opening to the pocket defined by a space between said partitions.

17. The process tower or column of claim 16, wherein the pocket is disposed at an angle to the axis of the tower or column.

18. The process tower or column of claim 16, wherein the pocket is disposed essentially orthogonally to the axis of the tower or column.

19. The process tower or column of claim 16, wherein the pocket is disposed essentially along the axis of the tower or column.

20. A process vessel designed to accommodate a vapor flowing along its length, comprising therein a mist eliminator, said mist eliminator comprising a plurality of mist eliminator sheets, each sheet formed into undulations that define a front wall and a back wall substantially parallel to each other, and a pocket extending along the back wall, wherein two partitions extending across the back wall from side walls adjacent said backwall define the pocket, an opening to the pocket defined by a space between said partitions.

21. The vessel of claim 20, wherein the pockets are disposed essentially vertically.

22. The vessel of claim 20, wherein the pockets are disposed essentially horizontally.

* * * * *